United States Patent [19]
Colvin

[11] Patent Number: 5,181,773
[45] Date of Patent: Jan. 26, 1993

[54] VEHICLE OCCUPANT RESTRAINT BELT BUCKLE INCLUDING ILLUMINATION

[76] Inventor: David S. Colvin, 23933 Haynes, Farmington Hills, Mich. 48024

[21] Appl. No.: 676,812

[22] Filed: Mar. 28, 1991

[51] Int. Cl.$^5$ .............................................. B60Q 1/00
[52] U.S. Cl. ...................................... 362/75; 362/253; 362/32; 362/61; 362/83.3; 280/801
[58] Field of Search .................... 362/108, 103, 33, 75, 362/196, 806, 83.3, 61, 32, 191, 253; 280/801

[56] References Cited

U.S. PATENT DOCUMENTS

| | | |
|---|---|---|
| 2,854,563 | 9/1958 | Catching . |
| 3,549,878 | 12/1970 | Bailey . |
| 3,588,811 | 6/1971 | Prickett . |
| 3,806,867 | 4/1974 | Quantz . |
| 3,840,853 | 10/1974 | Cukale . |
| 3,934,671 | 1/1976 | Hart . |
| 4,009,381 | 2/1977 | Schreiber et al. . |
| 4,052,775 | 10/1977 | Gavagan et al. . |
| 4,064,603 | 12/1977 | Romanzi, Jr. . |
| 4,112,482 | 9/1978 | Powell . |
| 4,186,425 | 1/1980 | Nadimi . |
| 4,283,756 | 8/1981 | Beamon . |
| 4,365,285 | 12/1982 | Brundidge . |
| 4,933,818 | 6/1990 | Eckmann .................... 362/83.3 X |
| 5,132,880 | 7/1992 | Kawamura ..................... 362/32 |

Primary Examiner—Larry Jones
Attorney, Agent, or Firm—Brooks & Kushman

[57] ABSTRACT

A vehicle occupant restraint belt buckle (24) for detachably securing a keeper (26) to secure a belt portion (22) is disclosed as including a hollow housing (32) including a translucent portion (38) and receiving a latch member (40) that is moved between latched and unlatched positions to detachably secure the keeper. An electrically energized light source (52) is mounted within the housing (32) to provide illumination through the translucent portion (38). Electrical connectors (64,65) within the housing (32) connect the light source (52) to a power supply so as to thereby energize the light source and provide illumination through the translucent portion (38). In one construction, the translucent portion (38) comprises a plastic button (68) that operates the latch member and, in another construction, the translucent portion (38) is spaced from the button that controls the latch member and is embodied either by an extremity of the light source or a separate component. A switch (74) is also preferably incorporated into the buckle and controls light source energization in response to the secured or detached condition of the keeper (26) by the latch member (40). Different embodiments of the restraint belt buckle include a single light source (52) and a pair of light sources (52,54) which may be embodied by electrical bulbs, light emitting diodes that each emit light of a single color, or a bipolar light emitting diode that selectively and alternately emits light of two different colors.

13 Claims, 5 Drawing Sheets

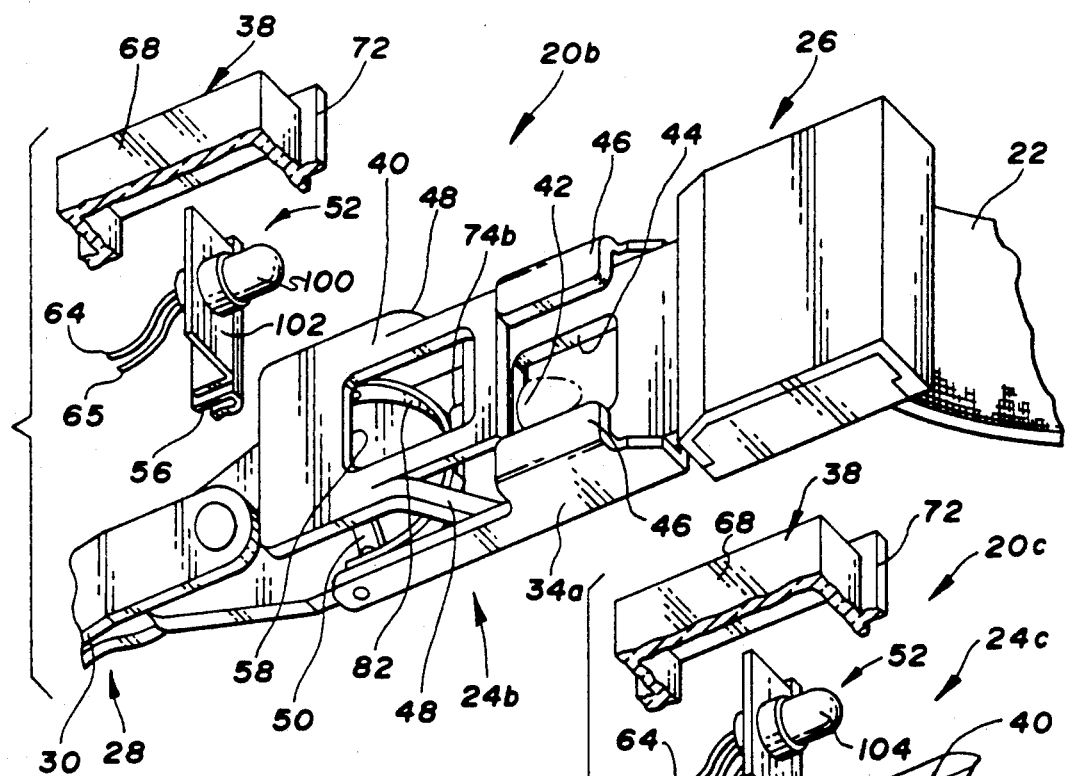
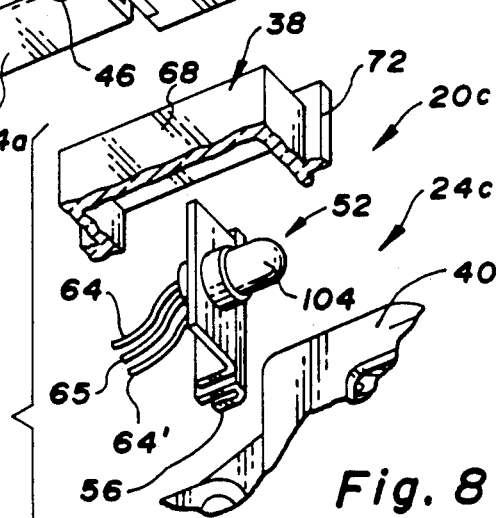
Fig. 7
Fig. 8
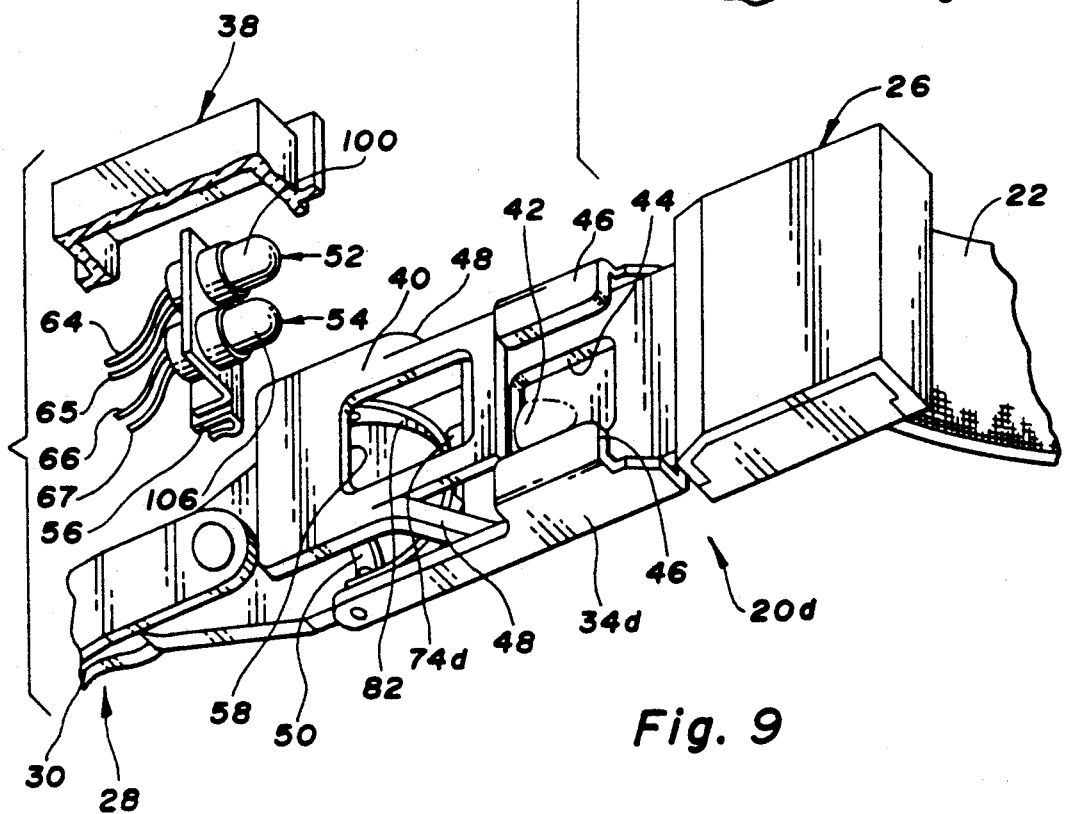
Fig. 9

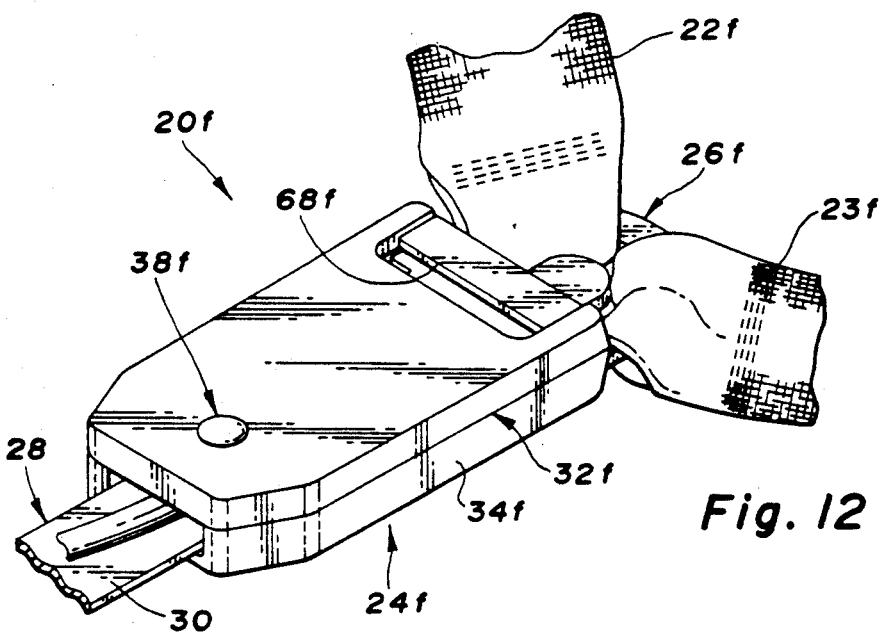
Fig. 12
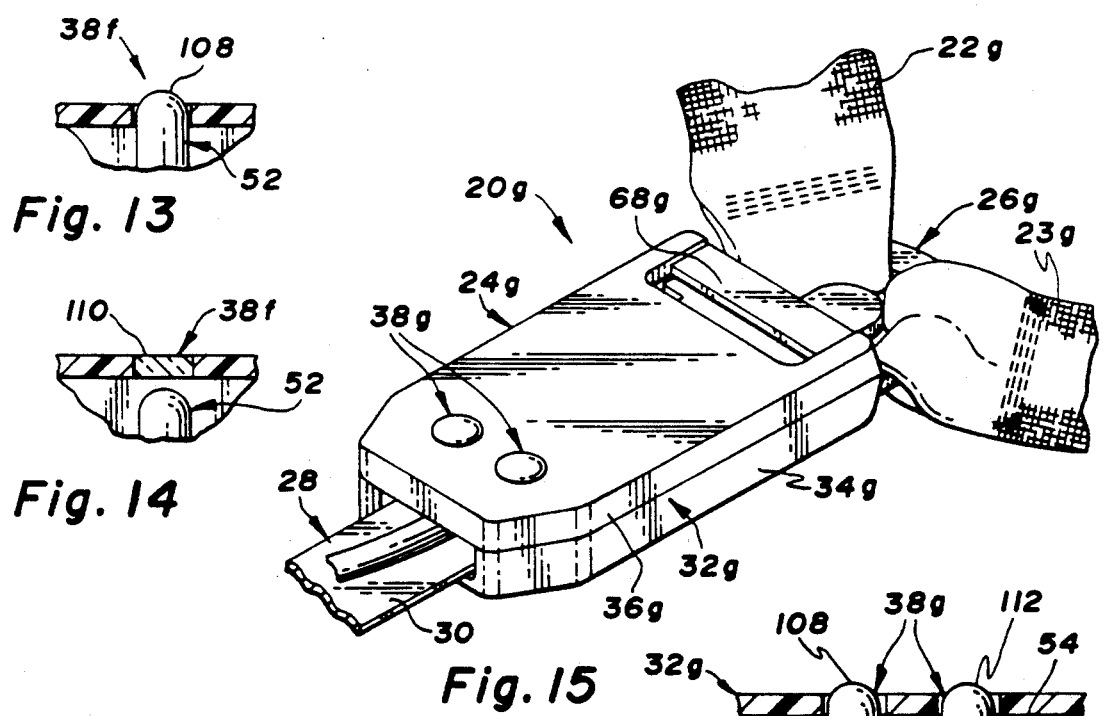
Fig. 13
Fig. 14
Fig. 15
Fig. 16
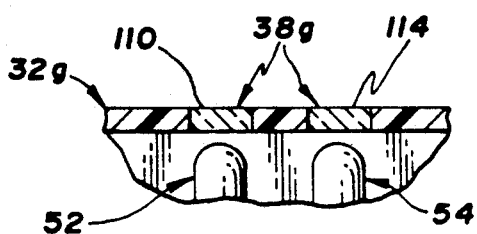
Fig. 17
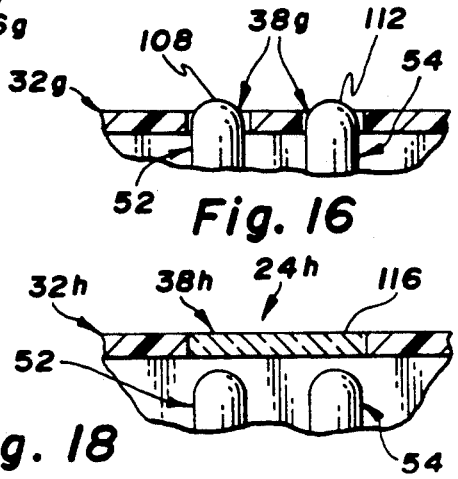
Fig. 18

VEHICLE OCCUPANT RESTRAINT BELT BUCKLE INCLUDING ILLUMINATION

TECHNICAL FIELD

This invention relates to a buckle for use with a vehicle occupant restraint belt system including at least one belt portion for restraining a vehicle occupant upon detachable securement of a keeper of the belt system by the buckle so as to secure the belt portion across the occupant.

BACKGROUND ART

Vehicle occupant restraint belt systems conventionally include at least one belt portion and a buckle for detachably securing a keeper of the belt system to secure the belt portion across the occupant so as to restrain the occupant from movement. The buckle normally includes a hollow housing in which a latch member is received for movement between latched and unlatched positions to detachably secure the keeper. Currently manufactured restraint belt systems for the most part have the keeper constructed with a D-shape and are thus referred to as a D-ring. The latch member is received within the opening of the D-shaped keeper to secure the keeper to the buckle in a latched position and is moveable from the latched positioned to an unlatched position to release the keeper from the buckle and thereby free the occupant from the restraint belt system. Conventional vehicle occupant restraint systems of this type are disclosed by U.S. Pat. Nos. 4,052,775 Gavagan et al and 4,064,603 Romanzi, Jr.

In order to ensure that the vehicle occupant restraint belt system is utilized, prior systems have incorporated indicators such as disclosed by U.S. Pat. No. 3,588,811 Prickett to provide a light indication at the instrument panel of the securement of the keeper by the buckle. Likewise, as disclosed by U.S. Pat. Nos. 3,806,867 Quantz and 3,934,671 Hart, vehicles have also utilized ignition interlocks, with or without a warning device, to prevent vehicle operation when the restraint belt system is not in place with the keeper secured by the buckle.

Prior vehicle restraint belt systems such as disclosed by U.S. Pat. No. 4,365,285 Brundidge have also included an illuminated clip which attaches to one end of the belt and is illuminated by a fiber optic cord from a remote light source when the buckle and the keeper are in a detached relationship from each other. Upon securement of the keeper by the buckle, a switch is open circuited such that the remote light source is extinguished and the illumination by the clip is likewise extinguished. Provision of this illumination clip and the associated fiber optic cord for lighting the clip for a remote source is not a particularly efficient arrangement for providing illumination of the buckle.

Other prior art references which were noted during the investigation conducted for the present invention but which relate to non-analogous art such as jewelry illumination and lighted night belts are disclosed by U.S. Pat. Nos.: 2,854,563 Catching; 3,549,878 Bailey; 3,840,853 Cukale; 4,009,381 Schreiber et al; 4,112,482 Powell; 4,186,425 Nadimi; and 4,283,756 Beamon.

DISCLOSURE OF INVENTION

An object of the present invention is to provide a vehicle occupant restraint belt system including an improved buckle that is illuminated to facilitate use of the belt system.

In carrying out the above and other objects of the invention, the occupant restraint belt system includes at least one belt portion for restraining a vehicle occupant as well as including the buckle for detachably securing a keeper of the belt system to secure the belt portion across the occupant utilizing the belt system. The buckle includes a hollow housing having a translucent portion that defines an exterior surface portion of the housing. The buckle also includes a latch member mounted within the housing for movement between latched and unlatched positions to detachably secure the keeper. An electrically energized light source of the buckle is mounted within the housing and, when energized, continuously provides illumination outwardly from the buckle housing through the translucent portion of the housing. Electrical connectors of the buckle are located within the housing for connecting the light source to a power supply so as to thereby energize the light source and provide the illumination through the translucent portion.

In one construction of the restraint belt buckle, the translucent portion of the housing is embodied by a plastic button that operates the latch member. More specifically, manual depression of the translucent plastic button moves the latch member of the buckle to the unlatched position to permit detachment of the keeper from the buckle. Manual release of the translucent plastic button allows the latch member to move under a spring bias back to the latched position.

In another construction, the vehicle occupant restraint belt buckle includes a button that operates the latch member and has the translucent portion of the housing spaced from the button. With this construction, the translucent portion can be embodied by an extremity of the light source or by a separate component adjacent which the light source is located within the housing.

In the preferred practice of the invention, the vehicle occupant restrain belt buckle also includes a switch that controls energization of the light source in response to the secured or detached condition of the keeper by the latch member.

The vehicle occupant restraint belt buckle is disclosed in one practice of the invention as including two light sources mounted within the housing, with one of the light sources emitting light of one color and with the other light source emitting light of another color. A suitable slide switch or the like provides a switch means for energizing only the one light source when the keeper is detached from the buckle and for energizing only the other light source when the keeper is attached to the buckle by the latch member. More specifically, the one light source is disclosed as emitting red light when the keeper is detached from the buckle to provide a warning as well as illumination of the buckle, and the other light source is disclosed as emitting green light when the keeper is attached to the buckle by the latch member to indicate that the restraint belt system is employed such that the vehicle is in condition for use. The two light sources are disclosed as being either a pair of light bulbs one of which emits light of one color and the other of which emits light of the other color, or a pair of light emitting diodes one of which emits light of the one color and the other of which emits light of the other color.

The restraint belt buckle is also disclosed in another practice of the invention as including a single light source mounted within the housing and as also including a suitable slide switch or the like for providing a switch means for energizing the single light source in response to the secured or detached condition of the keeper by the latch member. This single light source is disclosed as being: a bulb; a light emitting diode for emitting light of a single color; or a bipolar light emitting diode for selectively and alternately emitting light of two different colors such as red for indicating a detached condition of the keeper from the buckle and green for indicating the attached condition of the keeper to the buckle.

The objects, features and advantages of the present invention are readily apparent from the following detailed description of the best modes for carrying out the invention when taken in connection with the accompanying drawings.

BRIEF DESCRIPTION OF DRAWINGS

FIG. 7 is another exploded perspective view similar to FIG. 2 but illustrating another embodiment wherein a single light source is embodied by a light emitting diode that emits light of one color;

FIG. 8 is a partial view similar to FIG. 7 but illustrating a further modification wherein a single light source of the buckle is a bipolar light emitting diode for selectively and alternately emitting light of two different colors;

FIG. 9 is an exploded perspective view similar to FIG. 7 but illustrating the buckle as including a pair of light sources which are illustrated as light emitting diodes;

FIG. 10 is a perspective view of another embodiment of a restraint belt buckle according to the present invention wherein a pair of belt portions such as a lap and shoulder belt are secured by attachment of the keeper to the buckle;

FIG. 11 is a broken away perspective view of the buckle shown in FIG. 10;

FIG. 12 is a perspective view illustrating a further embodiment of the restraint belt buckle which includes a single light source located at a remote location from a button that is manually operated to detach the keeper from the buckle;

FIG. 13 is a partial sectional view illustrating the manner in which a translucent portion of the buckle shown in FIG. 10 can be embodied by an extremity of the light source;

FIG. 14 is a partial perspective view illustrating the manner in which a translucent portion of the buckle of FIG. 10 can be embodied by a separate component from the light source which is located adjacent the translucent portion;

FIG. 15 is a view of another embodiment of the buckle which is similar to the embodiment of FIG. 10 but incorporates a pair of translucent portions;

FIG. 16 is a partial sectional view illustrating the manner in which extremities of a pair of light sources can function as the translucent portions of the buckle shown in FIG. 15;

FIG. 17 is a partial sectional view illustrating the manner in which a pair of separate components function as the translucent portions of the buckle shown in FIG. 15 such that a pair of light sources adjacent the translucent portions provide the illumination; and FIG. 18 is a partial sectional view illustrating a further modification wherein a pair of light sources provide illumination through a single translucent portion of the buckle housing.

BEST MODE FOR CARRYING OUT THE INVENTION

Figure 1:
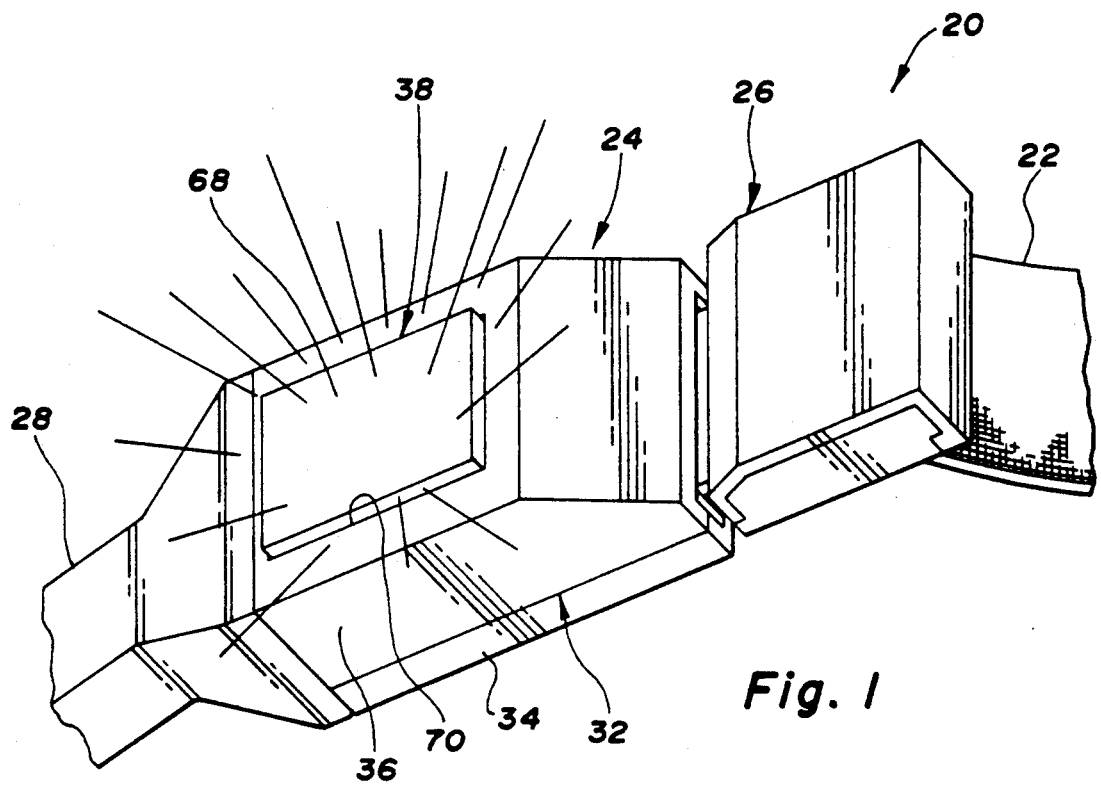
FIG. 1 is a perspective view of a vehicle occupant restraint belt system including one embodiment of a vehicle occupant restraint belt buckle constructed in accordance with the present invention.
Figure 2:
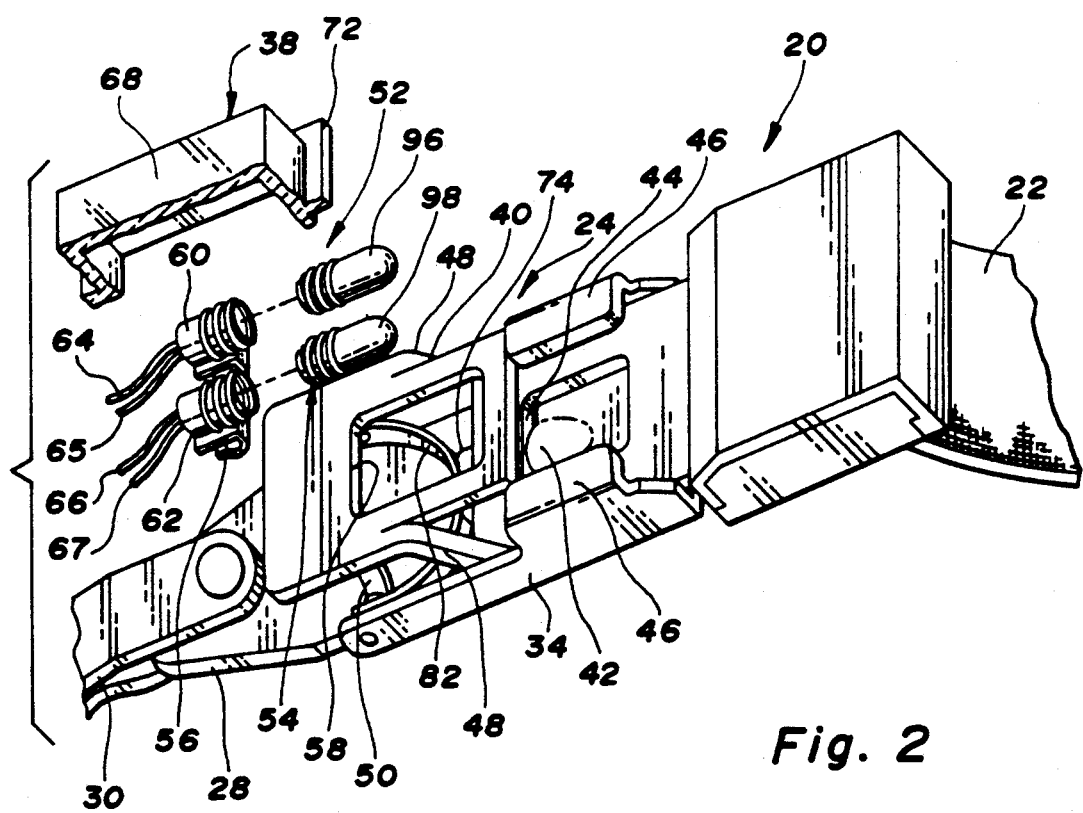
FIG. 2 is an exploded perspective view illustrating certain components of the buckle.

With reference to FIGS. 1 and 2 of the drawings, a vehicle occupant restraint belt system indicated generally by 20 includes at least one belt portion 22 for restraining a vehicle occupant upon employment of the system. A buckle 24 of the belt system detachably secures a keeper 26 as is hereinafter more fully described to secure the belt portion 22 across the occupant to thereby restrain the occupant from movement. More specifically, the belt portion 22 has one end secured to the keeper 26 in any suitable manner and has another end secured to the vehicle, while the buckle 24 has an end 28 that is secured by a connector 30 (FIG. 2) or by another belt portion connected to the vehicle in order to secure the restraint belt system 2 across the vehicle occupant. It should be noted that the keeper 26 as best illustrated by the phantom line representation in FIGS. 4 and 5 has the conventional D-ring construction.

With continuing reference to FIGS. 1 and 2, the buckle 24 includes a hollow housing 32 which is shown as including lower and upper housing portions 34 and 36 that are secured to each other in any conventional manner. This buckle housing 32 also includes a translucent portion 38 for permitting the passage of light as is hereinafter more fully described either with or without the diffusion of the light. A latch member 40 of the buckle 24 is mounted within the housing 32 as best shown in FIG. 2 for movement between the latched position illustrated and an unlatched position. In the latched position, a latching portion 42 of the latch member is received within the opening 44 of the D-ring keeper 26 to secure the keeper to the buckle. Flanges 46 of the lower housing portion 34 prevent the D-ring keeper from moving out of the housing unless the latch member 40 is moved to the unlatched position where the latching portion 42 is moved downwardly out of the D-ring keeper opening 44. This downward movement of the latching portion 42 is provided by pivoting of the latch member about a pair of support legs 48 against the bias of a slide type spring 50.

At least one electrically energized light source 52 and, as illustrated, a pair of light sources 52 and 54 are mounted within the housing to provide illumination through the translucent portion 38 as is hereinafter more fully described. A clip mount 56 is secured within an opening 58 of the latch member 40 to support a pair of sockets 60 and 62 that are connected by associated pairs of electrical connectors 64,65 and 66,67 to the vehicle electrical power supply so as to thereby energize each light source and provide illumination through the translucent portion 38 as is hereinafter more fully described.

With continuing reference to FIGS. 1 and 2, the translucent portion 38 of the buckle housing 32 is illustrated as being embodied by a plastic button 68 that is manually depressed to move the latch member 40 from the latched position shown in FIG. 2 to the unlatched position where the latching portion 42 is moved downwardly upon pivoting of the latch member about its legs 48. This plastic button 68 extends upwardly through an opening 70 in the upper housing portion 36 and has a peripheral flange 72 that captures the plastic button within the housing to limit the outward movement of the spring 50 acting through the latch member 40.

Figure 3:
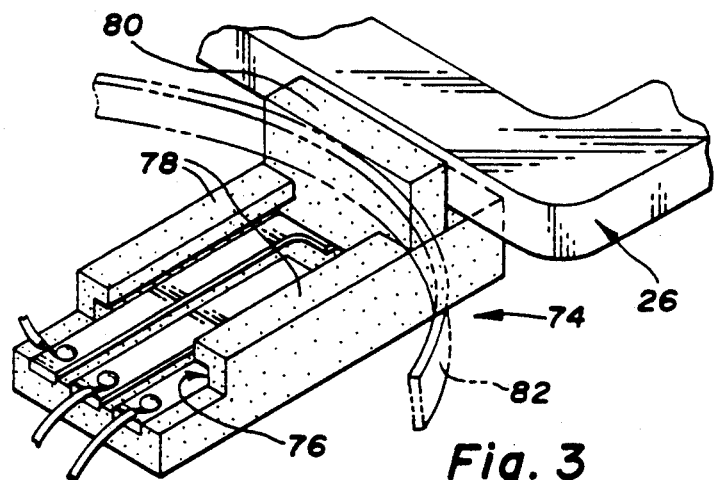
FIG. 3 is a perspective view that illustrates a slide switch of the buckle for selectively energizing a pair of light sources which in FIG. 2 are illustrated as electrical bulbs.
Figure 4:
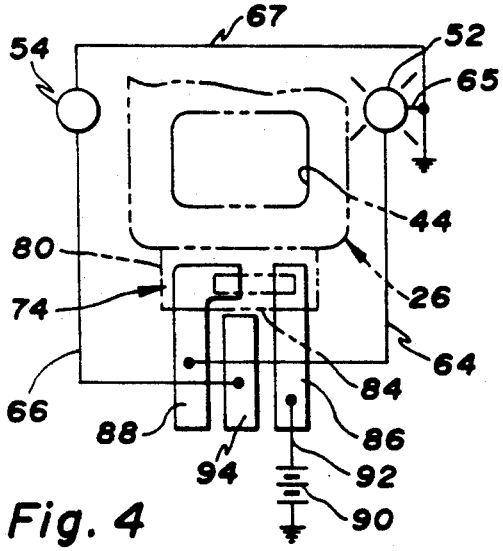
FIG. 4 is a view of an electrical circuit showing the switch prior to securement of the keeper by the buckle so as to energize one light source of the buckle.
Figure 5:
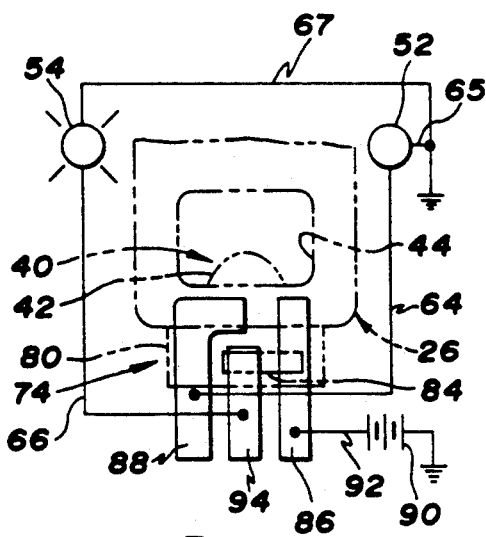
FIG. 5 is another view of the electrical circuit showing the switch after securement of the keeper by the buckle so as to energize the other light source of the buckle.

With combined reference to FIGS. 3, 4 and 5, the restraint belt buckle 24 shown in FIGS. 1 and 2 also preferably includes a switch 74 that controls energization of each light source 52 and 54 in response to the secured or detached condition of the D-ring keeper 26 by the latch member 40. More specifically, the switch 74 is illustrated as being of the slide type including a slideway 76 that is fixedly mounted on the lower housing portion 34 of the buckle housing 32 shown in FIGS. 1 and 2. This slideway 76 also includes a pair of ways 78 on which a slide 80 is slidably mounted and moved against the bias of a spring 82 as the D-ring keeper 26 is inserted into the buckle for securement. Prior to the insertion of the D-ring keeper 26 into the buckle, a contact 84 of the switch slide 80 is located as shown in FIG. 4 connecting two other contacts 86 and 88 that are mounted on the slideway 76 and connected through a respective wire connectors 64 and 66 to the first light source 52 for energization by a power supply 90 that is connected by a wire connector 92 to the one contact 86. Upon insertion of the D-ring keeper 26 into the buckle for securement by the latch member as previously described, the slide 80 is moved against the bias of spring 82 shown in FIG. 3 and its contact 84 is moved out of engagement with the contact 88 and into engagement with another contact 94. As such, the first light source 52 is de-energized and the second light source 54 is energized through its electrical connectors 66 and 67 through the power supply 90 through contact 86 and connector 92.

With reference to FIGS. 2, 4 and 5, the restraint belt buckle 24 illustrated as previously mentioned has two light sources 52 and 54 mounted within the housing 32. One of these light sources 52 emits light of one color and the other light source 54 emits light of another color. As was also previously mentioned, the switch 74 shown in FIG. 3 energizes only the one light source 52 when the keeper 26 is detached from the buckle 24 and energizes only the other light source 54 when the keeper is attached to the buckle by the latch member. More specifically, the one light source 52 may emit red light when the keeper is detached from the buckle to indicate that the vehicle is not in an operable condition due to the belt system being in an inoperable condition. Furthermore, the other light source 54 may emit green light when the keeper 26 is attached to the buckle 24 by the latch member so as to thereby indicate that the belt system is in an operable condition.

As illustrated in FIG. 2, the two light sources 52 and 54 are embodied by electrical bulbs 96 and 98 that are respectively received by the pair of sockets 60 and 62 on the clip type mount 56. Thus, the one bulb 96 will emit light of one color such as red light and the other bulb will emit light of another color such as green light as previously described.

Further embodiments of the vehicle occupant restraint belt buckle are described below and have the same construction as the embodiment previously described in connection with FIGS. 1 through 5 except as will be noted such that like reference numerals are applied to like components thereof and the previous description is thus applicable and need not be repeated.

Figure 6:
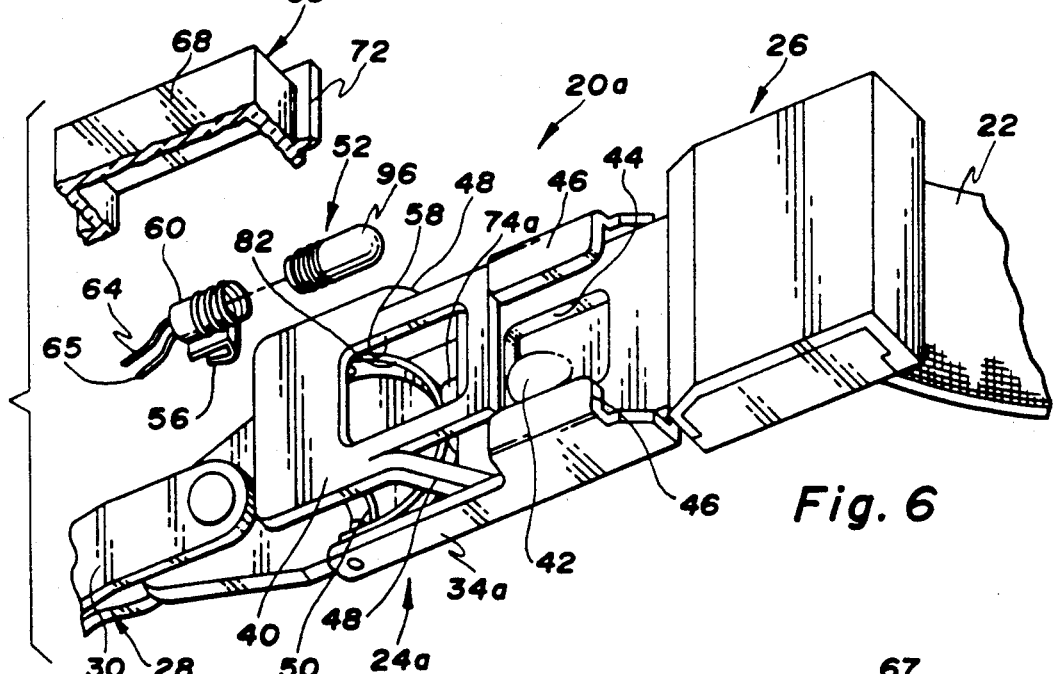
FIG. 6 is an exploded perspective view similar to FIG. 2 but illustrating another embodiment wherein the buckle includes a single light source which is illustrated as an electrical bulb.

With reference to FIG. 6, another embodiment of the vehicle occupant restraint belt system 20a has a buckle 24a including only a single light source 52 which is embodied by an electrical bulb 96 that is received by the one socket 60 on the clip mount 56 and thus connected by the wire connectors 64 and 65 to the switch 74a which may function to turn the light source 52 on or off in response to the securement of the keeper 26 by the buckle. Such operation of the light source 52 by shining through the translucent portion 38 provided by the button 68 that operates the latch member 40 thus provides a visual indication of the latched or unlatched condition of the buckle with respect to the keeper. Likewise, when the light is energized prior to the securement of the keeper by the buckle, the light shining through the translucent portion 38 facilitates location of the buckle for securement of the keeper.

With reference to FIG. 7, another embodiment of the vehicle occupant restraint belt system indicated by 20b has a single light source 52 embodied by a light emitting diode 100 that is received by an L-shaped support 102 on the clip mount 56 for securement to the latch member 40 within its openings 58. Furthermore, the switch 74b of this embodiment may, as with the embodiment of FIG. 6, turn the single light source 52 on or off in response to the securement of the keeper 26 by the buckle 24b.

With reference to FIG. 8, another embodiment of the vehicle occupant restraint belt system 20c has a buckle 24c that is only partially shown since it is the same as the embodiment of FIG. 7 except that its single light source 52 includes a bipolar light emitting diode 104 having hot connectors 64 and 64' as well as a common ground connector 65. Energizing of the bipolar light emitting diode 104 through the buckle switch and the connectors 64 and 65 causes it to emit light of one color while energization of the bipolar light emitting diode 104 through the buckle switch and connectors 64' and 65 causes it to emit light of another color. For example, the diode 104 can be energized to emit red light prior to securement of the associated keeper and can be energized to emit green light after the keeper is secured.

With reference to FIG. 9, another embodiment of the vehicle occupant restraint belt system 10d has a buckle 24d provided with a pair of light sources 52 and 54 that are embodied by separate light emitting diodes 100 and 106 for emitting light of two different colors. Thus, the one light emitting diode 100 of the first light source 52 emits light of one color such as red light prior to securement of the keeper 26 by the buckle 24d, and the other light emitting diode 106 of the other light source 54 emits light of another color such as green light after the keeper has been secured by the buckle.

Figures 10, 11:
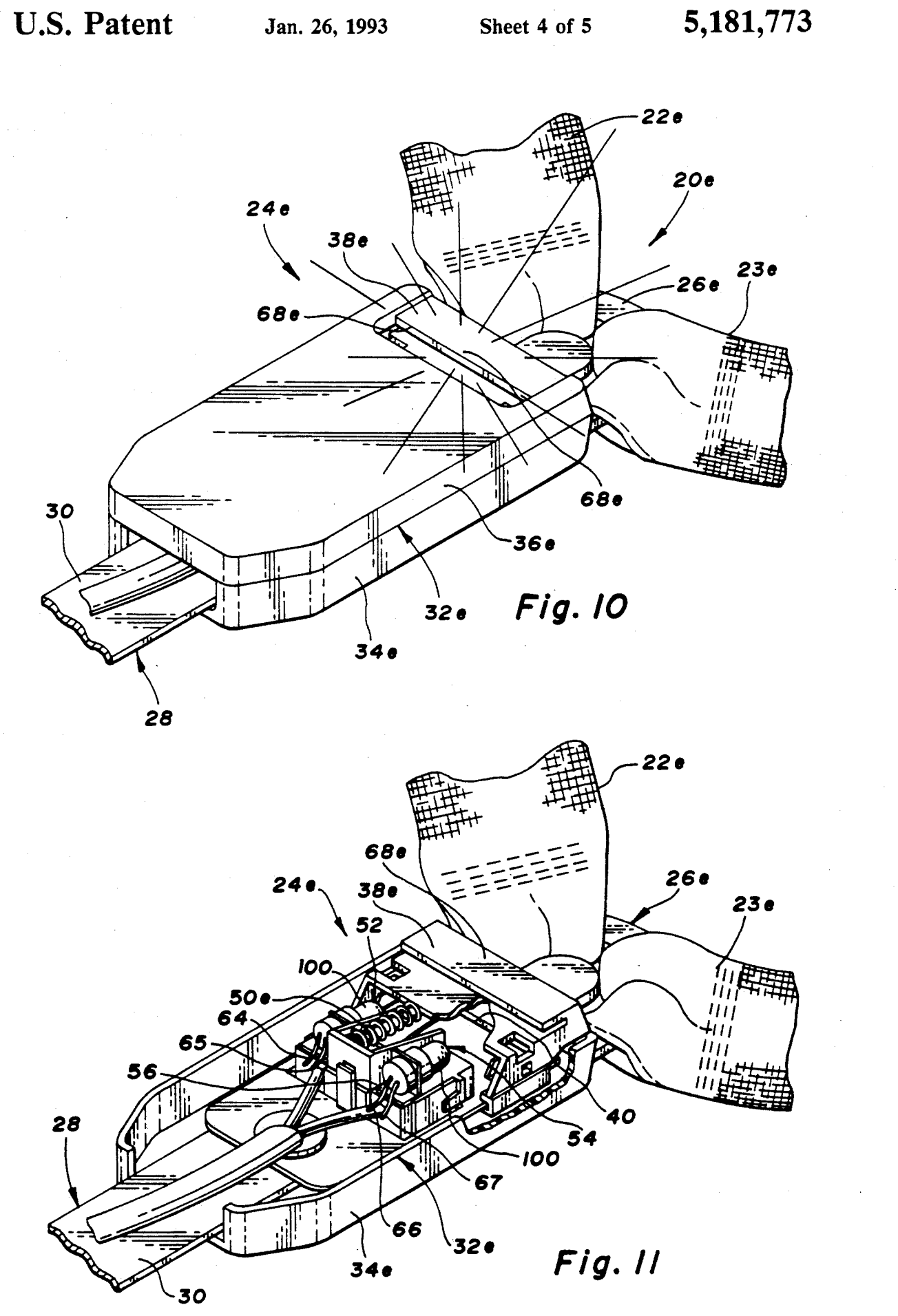

With reference to FIGS. 10 and 11, a further embodiment of the vehicle occupant restraint belt system 20e differs from the previously described embodiments in two respects. First, a pair of belt portions 22e and 23e such as shoulder and lap belts are secured by the keeper 26e upon attachment of the keeper by the buckle 24e. Furthermore, the buckle 24e is illustrated with its manually operable release button 68e that provides the translucent portion 38e being of the sliding type rather than of the pivoting type to provide latch member release. Such sliding type release buttons are well known and the construction thereof for moving the latch member to release the keeper thus need not be described in greater detail. Furthermore, while this construction of the buckle 24e is illustrated as having two light sources 52 and 54 embodied by two light emitting diodes 100 and 104, it is also possible to utilize two electrical bulbs as previously described for the two light sources or to utilize a single light source such as an electrical bulb, a light emitting diode that emits light of only one color or a bipolar light emitting diode that selectively and alternately emits light of two different colors.

With reference to FIG. 12, a further embodiment of the vehicle occupant restraint belt system 20f has a buckle 24f whose translucent portion 38f is located at a remote location from the manually operable slide button 68f that is moved to release the keeper 26f from the buckle. The translucent portion 38f of the buckle housing 32f is spaced from the release button 68f. In one version as illustrated in FIG. 13, the translucent portion 38f is embodied by an extremity 108 of the single light source 52 which may either be a bulb, a light emitting diode that emits light of a single color, or a bipolar light emitting diode that selectively and alternately emits light of two different colors. Furthermore, as illustrated in FIG. 14, it is also possible for the translucent portion 38f to be a separate component 110 of the buckle housing 32f through which the single light source 52 emits light upon being energized.

With reference to FIG. 15, a further embodiment of the vehicle occupant restraint belt system 20g has a buckle 24g that includes a pair of translucent portions 38g that are spaced from the release button 68g which is moved to move the latch member from the latched position to the unlatched position to release the keeper 26g to which the pair of belt portions 22g and 23g are secured. These translucent portions 38g as illustrated in FIG. 16 can be provided by extremities 108 and 112 of the pair of light sources 52 and 54, respectively, or, as illustrated in FIG. 17, may be provided by separate components 110 and 114 of the buckle housing 32g adjacent which the first and second light sources 52 and 54 are located to provide illumination upon being energized.

With reference to FIG. 18, a further embodiment of the restraint belt buckle 24h has its housing 32h provided with a translucent portion 38h embodied by a translucent component 116 that is spaced from the unshown release button that is moved to move the associated latch member to release the keeper. Both the first and second light sources 52 and 54 of this embodiment are located adjacent the single translucent component 116 of the buckle housing 32h so as to provide illumination therethrough upon being energized.

While the best modes for practicing the invention have been described in detail, those familiar with the art to which this invention relates will recognize various alternative, designs and embodiments as described by the following claims.

I claim:

1. For use in a vehicle occupant restraint belt system including at least one belt portion for restraining a vehicle occupant, a buckle for detachably securing a keeper of the belt system to secure the belt portion across the occupant, said buckle comprising:

a hollow housing including a translucent portion that defines an exterior surface portion of the housing;

a latch member mounted within the housing for movement between latched and unlatched positions to detachably secure the keeper;

an electrically energized light source that is mounted within the housing and that, when energized, continuously provides illumination outwardly from the buckle housing through the translucent portion; and electrical connectors within the housing for connecting the light source to a power supply so as to thereby energize the light source and provide illumination through the translucent portion.

2. A vehicle occupant restraint belt buckle as in claim 1 wherein the translucent portion of the housing comprises a plastic button that operates the latch member.

3. A vehicle occupant restraint belt buckle as in claim 1 further including a button that operates the latch member and wherein the translucent portion of the housing is spaced from the button.

4. A vehicle occupant restraint belt buckle as in claim 3 wherein the translucent portion is embodied by an extremity of the light source.

5. A vehicle occupant restraint belt buckle as in claim 3 wherein the translucent portion is a separate component from the light source and wherein the light source is located adjacent the translucent portion.

6. A vehicle occupant restrain belt buckle as in claim 1 further including a switch that controls energization of the light source in response to the secured or detached condition of the keeper by the latch member.

7. A vehicle occupant restraint belt buckle as in claim 1 which includes two light sources mounted within the housing, one of the light sources emitting light of one color and the other light source emitting light of another color, and switch means for energizing only the one light source when the keeper is detached from the buckle and for energizing only the other light source when the keeper is attached to the buckle by the latch member.

8. A vehicle occupant restraint belt buckle as in claim 7 wherein the one light source emits red light when the keeper is detached from the buckle and wherein the other light source emits green light when the keeper is attached to the buckle by the latch member.

9. A vehicle occupant restraint belt buckle sa in claim 7 wherein the two light sources are selected from the group consisting of:

(a) a pair of bulbs one of which emits light of the one color and the other of which emits light of the other color; and (b) a pair of light emitting diodes one of which emits light of the one color and the other of which emits light of the other color.

10. A vehicle occupant restraint belt buckle as in claim 1 which includes a single light source mounted within the housing, and further including switch means for energizing the single light source in response to the secured or detached condition of the keeper by the latch member.

11. A vehicle occupant restraint belt buckle as in claim 10 wherein the single light source is selected from the group consisting of:
   (a) a bulb;
   (b) a light emitting diode for emitting light of a single color; and
   (c) a bipolar light emitting diode for selectively and alternately emitting light of two different colors.

12. For use in a vehicle occupant restraint belt system including at least one belt portion for restraining a vehicle occupant, a buckle for detachably securing a keeper of the belt system to secure the belt portion across the occupant, said buckle comprising:
   a hollow housing including a translucent portion that functions as a manually operable latch member operator;
   a latch member mounted within the housing for movement between latched and unlatched positions to detachably secure the keeper under the control of the translucent latch member operator;
   an electrically energized light source that is mounted within the housing and that, when energized, continuously provides illumination outwardly from the buckle housing through the translucent latch member operator;
   electrical connectors within the housing for connecting the light source to a power supply so as to thereby energize the light source and provide illumination through the translucent portion; and
   a switch that controls energization of the light source in response to the secured or detached condition of the keeper by the latch member.

13. For use in a vehicle occupant restraint belt system including at least one belt portion for restraining a vehicle occupant, a buckle for detachably securing a keeper of the belt system to secure the belt portion across the occupant, said buckle comprising:
   a hollow housing including a translucent portion that functions as a manually operable latch member operator;
   a latch member mounted within the housing for movement between latched and unlatched positions to detachably secure the keep under the control of the translucent latch member operator;
   an electrically energized light source that is mounted within the housing and that, when energized, continuously provides illumination outwardly from the buckle housing through the translucent latch member operator, and said light source being selected from the group consisting of a bulb and a light emitting diode;
   electrical connectors within the housing for connecting the light source to a power supply so as to thereby energize the light source and provide illumination through the translucent portion; and
   a switch that controls energization of the light source in response to the secured or detached condition of the keeper by the latch member.

* * * * *

UNITED STATES PATENT AND TRADEMARK OFFICE
CERTIFICATE OF CORRECTION

PATENT NO. : 5,181,773
DATED : January 26, 1993
INVENTOR(S) : David S. Colvin

It is certified that error appears in the above-indentified patent and that said Letters Patent is hereby corrected as shown below:

Column 4, line 43, "2" should be --20--.

Column 10, line 16, (claim 13) "keep" should be --keeper--.

Signed and Sealed this

Twenty-second Day of February, 1994

Attest:

BRUCE LEHMAN

*Attesting Officer*   *Commissioner of Patents and Trademarks*